US012512520B2

(12) United States Patent
Ruan et al.

(10) Patent No.: US 12,512,520 B2
(45) Date of Patent: Dec. 30, 2025

(54) TESTING APPARATUS

(71) Applicant: CONTEMPORARY AMPEREX TECHNOLOGY (HONG KONG) LIMITED, Hong Kong (CN)

(72) Inventors: Keyu Ruan, Fujian (CN); Shaoteng Ren, Fujian (CN); Lixin Guo, Fujian (CN); Hongyu Zheng, Fujian (CN); Fan Yang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 306 days.

(21) Appl. No.: 18/219,116

(22) Filed: Jul. 7, 2023

(65) Prior Publication Data

US 2024/0106013 A1    Mar. 28, 2024

Related U.S. Application Data

(63) Continuation of application No. PCT/CN2023/080493, filed on Mar. 9, 2023.

(30) Foreign Application Priority Data

Sep. 28, 2022   (CN) .......................... 202222593465.5

(51) Int. Cl.
*H01M 10/42*    (2006.01)
*A62C 3/16*     (2006.01)
(Continued)

(52) U.S. Cl.
CPC ........... *H01M 10/4285* (2013.01); *A62C 3/16* (2013.01); *E05B 65/0003* (2013.01);
(Continued)

(58) Field of Classification Search
CPC ...... H01M 10/4285; A62C 3/16; A62C 37/38; E05B 65/0003; E05B 65/025; E05C 7/00;
(Continued)

(56) References Cited

U.S. PATENT DOCUMENTS 2,130,617 A * 9/1938 Dockham ............. F25D 23/025
62/DIG. 11
2,470,956 A * 5/1949 Savidge ................ F25D 23/025
62/517
(Continued)

FOREIGN PATENT DOCUMENTS

CN    104001297 A    8/2014
CN    108152756 A    6/2018
(Continued)

OTHER PUBLICATIONS

KR-20230148872-A, English Translation (Year: 2023).*
(Continued)

*Primary Examiner* — Ryan D Walsh
(74) *Attorney, Agent, or Firm* — XSENSUS LLP (57) ABSTRACT

Embodiments of this application provide a testing apparatus, configured to test a battery and including a test body and a first door body. The test body may include an accommodating cavity for accommodating the battery, and an opening. The opening may communicate with the accommodating cavity, and the first door body may be connected to the opening and capable of moving relative to the opening. The first door body may have a first state and a second state; in the first state, the first door body may block a part of the opening; and in the second state, the first door body may seal the opening.

18 Claims, 3 Drawing Sheets

(51) Int. Cl.
  *E05B 65/00* (2006.01)
  *E05B 65/02* (2006.01)
  *E05C 7/00* (2006.01)
  *E05C 7/04* (2006.01)
  *E06B 3/36* (2006.01)
  *E06B 5/12* (2006.01)
  *F25D 23/02* (2006.01)
  *A47B 96/00* (2006.01)
  *A62C 37/38* (2006.01)
  *E05F 17/00* (2006.01)

(52) U.S. Cl.
  CPC .............. *E05B 65/025* (2013.01); *E05C 7/00* (2013.01); *E05C 7/045* (2013.01); *E06B 3/362* (2013.01); *E06B 3/367* (2013.01); *E06B 5/12* (2013.01); *F25D 23/025* (2013.01); *A47B 96/00* (2013.01); *A62C 37/38* (2013.01); *E05F 17/002* (2013.01); *E05F 2017/008* (2013.01)

(58) Field of Classification Search
  CPC .......... E05C 7/045; E06B 3/362; E06B 3/367; E06B 5/12; F25D 23/025; A47B 96/00; E05F 17/002; E05F 2017/008
  See application file for complete search history.

(56) References Cited

U.S. PATENT DOCUMENTS

| | | | | |
|---|---|---|---|---|
| 5,339,643 A | * | 8/1994 | Pikaart | ................. F25D 23/025 |
| | | | | 62/298 |
| 8,894,110 B2 | * | 11/2014 | Taylor | ................... E05C 19/184 |
| | | | | 292/288 |
| 2005/0138955 A1 | * | 6/2005 | Okuda | .................... F25D 25/02 |
| | | | | 312/401 |
| 2015/0345855 A1 | * | 12/2015 | Parkes | .................... F25D 23/02 |
| | | | | 312/236 |
| 2021/0123664 A1 | * | 4/2021 | Okada | .................. F25D 23/028 |
| 2024/0216734 A1 | * | 7/2024 | He | ........................ B65D 85/68 |

FOREIGN PATENT DOCUMENTS

| | | | |
|---|---|---|---|
| CN | 108853837 A | 11/2018 | |
| CN | 211182435 U | 8/2020 | |
| CN | 211513212 U | 9/2020 | |
| CN | 213449993 U | 6/2021 | |
| CN | 213482414 U | 6/2021 | |
| CN | 215369534 U | 12/2021 | |
| CN | 215638281 U | 1/2022 | |
| CN | 215841318 U | 2/2022 | |
| CN | 215894680 U | 2/2022 | |
| CN | 216380946 U | 4/2022 | |
| CN | 216915577 U | 7/2022 | |
| CN | 218584849 U | 3/2023 | |
| FR | 2909120 A1 | 5/2008 | |
| KR | 20230148872 A | * 10/2023 | ............. A47B 81/00 |

OTHER PUBLICATIONS

Extended European Search Report issued Dec. 2, 2024 in European Patent Application No. 23734891.7.

International Search Report mailed on Jun. 13, 2023, received for PCT Application PCT/CN2023/080493, filed on Mar. 9, 2023, 7 pages including English Translation.

* cited by examiner

TESTING APPARATUS

CROSS-REFERENCE TO RELATED APPLICATIONS

This application is a continuation of International Application No. PCT/CN20231080493, filed Mar. 9, 2023, which claims priority to Chinese Patent Application No. 202222593465.5, filed on Sep. 28, 2022 and entitled "TESTING APPARATUS", each of which is incorporated herein by reference in its entirety.

TECHNICAL FIELD

This application pertains to the field of battery testing technologies, and in particular, to a testing apparatus.

BACKGROUND

As consumption of natural resources and environmental damage increase, apparatuses that can store energy and effectively utilize the stored energy are of increasing interest in various fields. Battery cells are systems that can be combined with each other and that utilize new renewable energy.

During production and research and development of battery cells, various tests are required, tests are usually conducted in many extreme conditions, for example, high temperature and high pressure, and battery cells in the extreme conditions are prone to greatly increasing hazards of safety accidents. However, testing apparatuses in a related art feature relatively low safety, which is not conducive to testing of the battery cells.

SUMMARY

Embodiments of this application provide a testing apparatus, which can improve safety of battery cells during testing.

An embodiment of this application provides a testing apparatus, configured to test a battery and including a test body and a first door body. The test body includes an accommodating cavity for accommodating the battery, and an opening. The opening communicates with the accommodating cavity, and the first door body is connected to the opening and capable of moving relative to the opening. The first door body has a first state and a second state; in the first state, the first door body blocks a part of the opening; and in the second state, the first door body seals the opening.

With the foregoing structure, the first door body is disposed, so that a partial region of the opening can be blocked, thereby effectively improving structural strength of the testing apparatus and further improving safety of the testing apparatus during use.

In some optional embodiments of this application, the opening includes a bottom edge located at a bottom end of the opening along a vertical direction, the first door body abuts against the bottom edge, and in the first state, the first door body seals a bottom of the opening.

With the foregoing structure, the first door body is disposed at the bottom edge of the opening, so that the first door body can seal a bottom of the opening in the first state to make a bottom of the accommodating cavity form a pool-shaped structure, where the pool-shaped structure has a function of storing a liquid. Generally, a battery cell may ignite during a safety accident; in this case, the foregoing pool-shaped structure is able to effectively store a fire extinguishing liquid during a fire extinguishing operation. Finally, the battery in the accommodating cavity is fully submerged in the fire extinguishing liquid, resulting in a substantial fire suppression effect and further enhancing the safety of the testing apparatus during use.

In some optional embodiments of this application, the testing apparatus further includes a second door body, the second door body is disposed on a side of the first door body farther away from the accommodating cavity, and the second door body is configured to seal the opening.

With the foregoing structure, the second door body is disposed, so that the accommodating cavity is completely sealed, thereby facilitating testing of the battery in the accommodating cavity.

In some optional embodiments of this application, the opening further includes a side edge connected to the bottom edge, and the first door body is rotatably connected to the side edge.

With the foregoing structure, the first door body is rotatably connected to the side edge, to facilitate switching between the first state and the second state of the first door body.

In some optional embodiments of this application, the side edge includes a first side edge and a second side edge correspondingly disposed on two sides of the bottom edge along a first direction, the first door body includes a first portion and a second portion, the first portion is rotatably connected to the first side edge, the second portion is rotatably connected to the second side edge, and the first direction is perpendicular to the vertical direction.

With the foregoing structure, on the one hand, the first portion and the second portion are disposed, which can shorten a dimension of the first door body in the first direction, shorten a distance from a rotating shaft on the first door body to the edge of the first door body, and further shorten a longest moment on the rotating shaft, so that the first door body in the first state is not apt to be opened under external force. On the other hand, the first portion is rotatably connected to the first side edge, and the second portion is rotatably connected to the second side edge, so that the first door body is a dual-door structure, which shortens an extension dimension of the first door body towards the outside of the testing apparatus in the second state, and reduces interference of the testing apparatus to external space.

In some optional embodiments of this application, the first portion and the second portion in the second state are rotated to reach a side farther away from the accommodating cavity.

With the foregoing structure, the first portion and the second portion in the second state are rotated to reach the side farther away from the accommodating cavity, which can reduce interference of switching between the first portion and the second portion on the accommodating cavity.

In some optional embodiments of this application, the first door body further includes a fastening member or fastener, and the fastening member is configured to fasten the first portion to the second portion in the first state.

With the foregoing structure, the fastening member is disposed, which can fix a positional relationship between the first portion and the second portion and improve mechanical strength of the first door body.

In some optional embodiments of this application, the fastening member includes a fastening hook and a fastening rod, a plurality of fastening hooks are disposed, the plurality of fastening hooks are respectively disposed on the first portion and the second portion, and the fastening rod fits the fastening hook and is able to be accommodated in the plurality of fastening hooks.

With the foregoing structure, the fastening hook and the fastening rod are disposed, which can facilitate fastening of the first portion and the second portion.

In some optional embodiments of this application, the first door body further includes a restraint member or structure, and the restraint member is configured to fasten the first door body to the opening in the first state.

With the foregoing structure, the restraint member is disposed, which can fix a positional relationship between the first door body and the opening and improve mechanical strength of the first door body in the first state.

In some optional embodiments of this application, the restraint member includes a restraint pin and a restraint trough, the restraint pin is disposed on the first door body and is movable relative to the first door body, the restraint pin fits the restraint trough and is able to move into the restraint trough, and the restraint trough is disposed on the bottom edge.

With the foregoing structure, the restraint pin and the restraint trough are disposed, so that the structure of the restraint member is simple, which facilitates disposition of the restraint member.

In some optional embodiments of this application, at least two restraint members are disposed, and the two restraint members are respectively disposed on the first portion and the second portion.

With the foregoing structure, at least two restraint members are disposed, which can fix a positional relationship between the first door body and the opening and improve mechanical strength of the first door body in the first state.

In some optional embodiments of this application, the restraint member is disposed on a side, closer to the bottom edge, of the first door body, and the fastening member is disposed on a side, farther away from the bottom edge, of the first door body.

With the foregoing structure, the restraint member is disposed on the side, closer to the bottom edge, of the first door body, and the fastening member is disposed on the side, farther away from the bottom edge, of the first door body. On the one hand, it is convenient for the restraint member to fasten the first door body to the bottom edge. On the other hand, there are fastening structures on both sides of the first door body in the vertical direction, which significantly improves the mechanical strength of the first door body.

In some optional embodiments of this application, the testing apparatus further includes a bulge member circumferentially disposed around the opening, so that the first door body abuts against the bulge member by reducing an area of the opening.

With the foregoing structure, the bulge member being disposed can form the sill structure at the opening, thereby improving airtightness after the opening is connected to the second door body.

In some optional embodiments of this application, the testing apparatus further includes a sealing assembly, where the sealing assembly is disposed on a side, closer to the accommodating cavity, of the bulge member, fits the first door body, and is able to abut against an edge on a side, closer to the accommodating cavity, of the first door body in the first state.

With the foregoing structure, the sealing assembly is disposed, which can seal a gap between the first door body and the opening, thereby significantly improving a sealing effect of the first door body on a part of the opening.

In some optional embodiments of this application, the sealing assembly includes a bottom rod and upright rods on two sides of the bottom rod along the first direction, a bottom of the upright rod is connected to a top of the bottom rod, and the bottom rod is disposed on a side, closer to the bottom edge, of the accommodating cavity, and is connected to a side, closer to the accommodating cavity, of the bulge member or structure; and in the first state, a side, farther away from the accommodating cavity, of the bottom rod abuts against the bottom of the first door body, and sides, farther away from the accommodating cavity, of the two upright rods abut against two sides of the first door body respectively along the first direction.

With the foregoing structure, the upright rod and the bottom rod are disposed, so that the sealing assembly is U-shaped, which can simultaneously seal an upper bottom and both sides of the first door body, thereby improving the sealing effect on the first door body. In addition, the bottom rod is connected to the bulge member, which also endows the sealing assembly with excellent mechanical strength.

In some optional embodiments of this application, the testing apparatus further includes a fire extinguishing member or extinguisher, and the fire extinguishing member is configured to spray a fire extinguishing liquid into the accommodating cavity.

With the foregoing structure, the fire extinguishing member is disposed, to facilitate quick response when a fire occurs in the accommodating cavity.

In some optional embodiments of this application, a dimension of the first door body is greater than a dimension of the battery along the vertical direction.

With the foregoing structure, the dimension of the first door body is greater than the dimension of the battery, so that the fire extinguishing liquid stored in the formed pool-shaped structure is high enough to submerge the battery, thereby improving the fire extinguishing effect on the battery.

In some optional embodiments of this application, the testing apparatus further includes a sensor, and the sensor is disposed in the accommodating cavity and configured to send an electrical signal when thermal runaway occurs in the battery.

With the foregoing structure, the sensor is disposed, so that an alarm can be sent when thermal runaway occurs.

In some optional embodiments of this application, the testing apparatus further includes an exhaust member or structure, and the exhaust member is disposed in the accommodating cavity and configured to discharge gas from the accommodating cavity.

With the foregoing structure, the exhaust member is disposed, which can promote rapid discharge of gas from the accommodating cavity.

In some optional embodiments of this application, the testing apparatus further includes a processor, and the processor is electrically connected to the sensor, the fire extinguishing member, and the exhaust member.

With the foregoing structure, the processor is disposed, which can control the sensor, the fire extinguishing member, and the exhaust member, thereby improving automation of the testing apparatus.

Compared with the related art, in the testing apparatus in the embodiments of this application, the first door body is disposed, so that a partial region of the opening can be blocked, thereby effectively improving structural strength of the testing apparatus and further improving safety of the testing apparatus during use.

BRIEF DESCRIPTION OF DRAWINGS

The following describes features, advantages, and technical effects of the exemplary embodiments of this application with reference to the accompanying drawings.

Other drawings may still be derived from these accompanying drawings without creative efforts.

In the accompanying drawings:
1. test body; 11. accommodating cavity; 12. opening; 121. bottom edge; 122. first side edge; 123. second side edge; 2. first door body; 21. first portion; 22. second portion; 3. second door body; 31. observation window; 4. sealing assembly; 41. upright rod; 42. bottom rod; 5. fastening member; 51. fastening rod; 52. fastening hook; 53. fastening shaft; 54. placement hook; 6. restraint member; 7. fire extinguishing member; 71. fire extinguishing pipeline; 72. sprinkler head; and 8. bulge member.

In the accompanying drawings, the figures are not necessarily drawn to scale.

DESCRIPTION OF EMBODIMENTS

The following further describes implementations of this application in detail with reference to accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to specific orientations. These terms shall therefore not be construed as limitations on this application. In addition, the terms "first", "second", "third", and the like are merely for the purpose of description and shall not be understood as any indication or implication of relative importance. "Vertical" means being vertical within an allowable range of error other than being strictly vertical. "Parallel" means being parallel within an allowable range of error other than being strictly parallel.

Reference to "embodiment" in this application means that specific features, structures, or characteristics described with reference to this embodiment may be included in at least one embodiment of this application. The word "embodiment" appearing in various places in the specification does not necessarily refer to the same embodiment or an independent or alternative embodiment that is exclusive of other embodiments. A person skilled in the art can clearly and implicitly understand that the embodiments described in this application can be combined with other embodiments.

The orientation terms appearing in the following description all refer to the orientations shown in the figures, and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. A person of ordinary skill in the art can understand specific meanings of these terms in this application as appropriate to specific situations.

Currently, from a perspective of market development, traction batteries have been increasingly widely used. The traction batteries are widely used not only in energy storage power supply systems such as hydro, thermal, wind, and solar power plants, but also in electric transportation tools such as electric bicycles, electric motorcycles, electric vehicles, and a plurality of fields such military equipment and aerospace. With continuous expansion of application fields of the traction batteries, market demands for the traction batteries are also increasing.

The battery mentioned in the embodiments of this application is a single physical module including one or more battery cells for providing a higher voltage and capacity. For example, the battery mentioned in this application may include a battery module, a battery pack, or the like.

The battery cell in this application may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. This is not limited in the embodiments of this application. The battery cell may be cylindrical, flat, or cuboid, or have other shapes. This is not limited in the embodiments of this application either.

During production and research and development of the battery, testing the battery is an inevitable process. During the testing, structural damages to the battery are inevitable, causing a short circuit in the battery and a rapid rise in battery temperature. When electrolyte inside the battery is heated, it can generate a considerable amount of flammable and explosive gas, which is likely to cause safety accidents of the battery such as fires. The inventors have found that in a related art, when a battery in a testing apparatus catches fire, an opening communicating with the accommodating cavity experiences relatively large pressure, resulting in a relatively large safety risk. In addition, a method for extinguishing the fire is to spray a fire extinguishing liquid or agent directly onto the fire. However, due to the battery housing having excellent sealing performance, using fire extinguishing spray can only put out surface fires on the battery. The fire extinguishing effect inside the battery is inadequate, which not only makes it challenging to determine the extent of the fire, but also greatly increases the risk of severe fires, thereby posing a significant threat to the safety of the battery testing process.

To improve the safety of the battery testing process, the inventors have found through research that the testing apparatus can be modified to include a specific storage capacity for fire extinguishing liquid. During fire extinguishing, the battery can be fully submerged in the stored fire extinguishing liquid, which substantially enhances the fire extinguishing effect of the testing apparatus, thereby improving safety of the battery during testing.

Based on the foregoing considerations, the inventors of this application design a testing apparatus through in-depth research.

Figure 1:
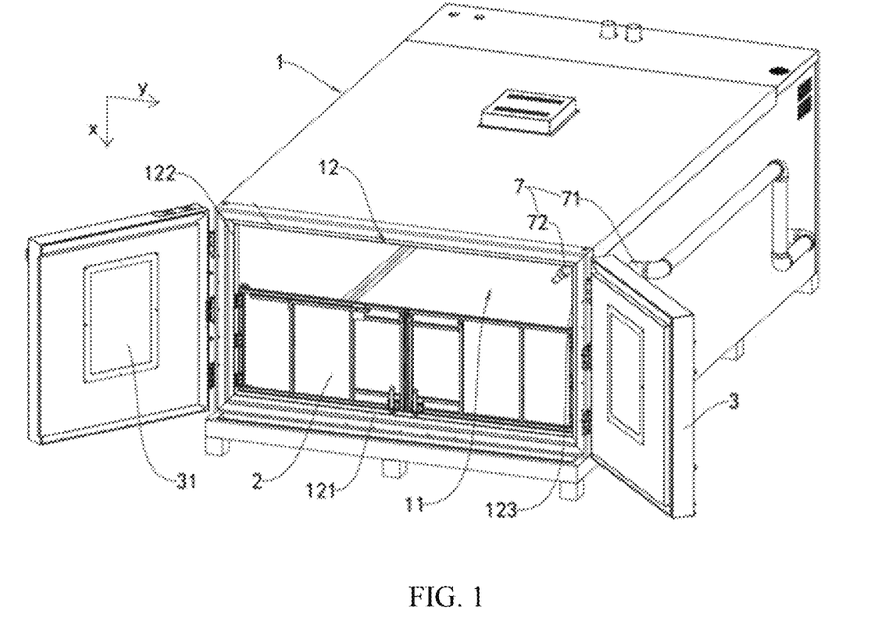
FIG. 1 is a schematic structural diagram of a testing apparatus being in a first state according to some embodiments of this application.
Figure 2:
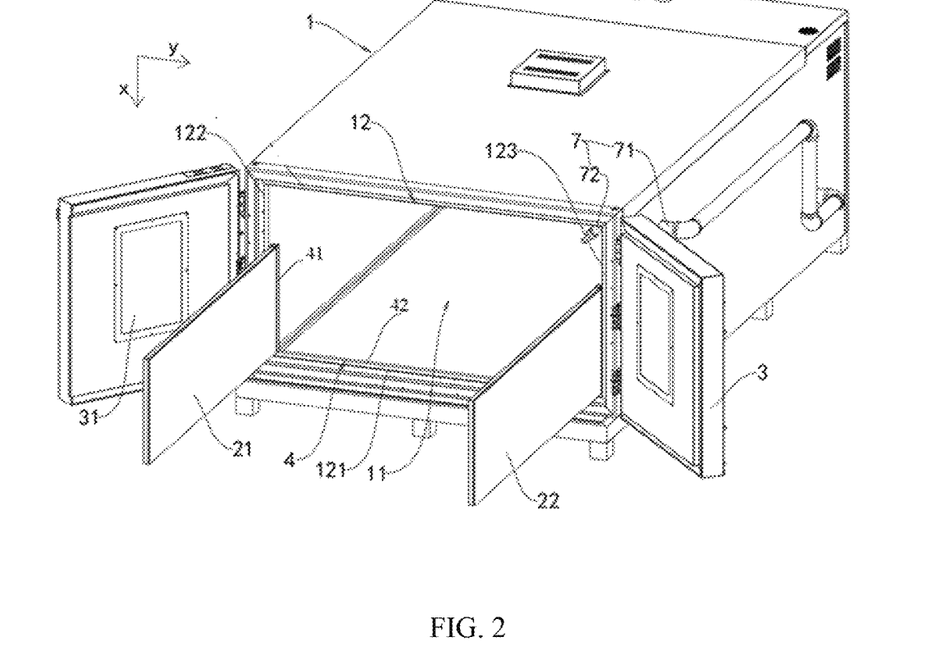
FIG. 2 is a schematic structural diagram of a testing apparatus being in a second state according to some embodiments of this application.
Figure 3:
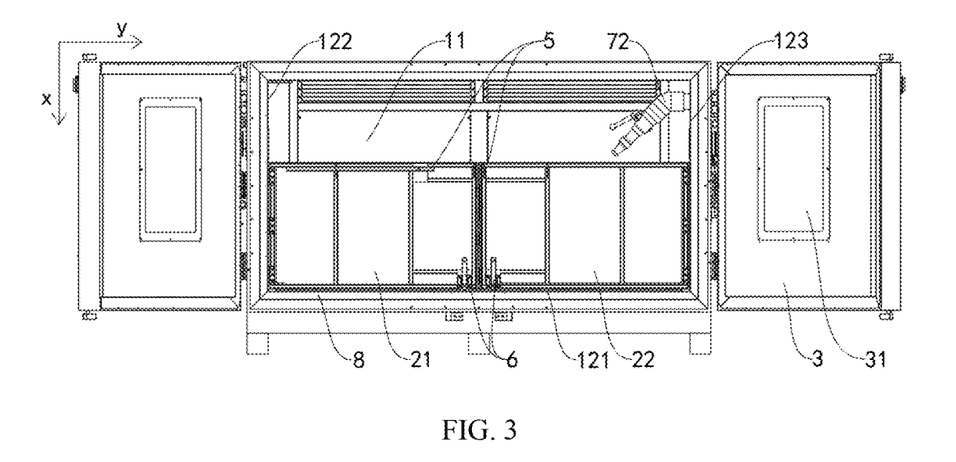
FIG. 3 is a schematic structural diagram of a testing apparatus being in the first state from another perspective according to some embodiments of this application.

FIG. 1 is a schematic structural diagram of a testing apparatus being in a first state according to some embodiments of this application. FIG. 2 is a schematic structural diagram of a testing apparatus being in a second state according to some embodiments of this application. FIG. 3 is a schematic structural diagram of a testing apparatus being in the first state from another perspective according to some embodiments of this application. As shown in FIG. 1 to FIG. 3, an embodiment of this application provides a testing apparatus, configured to test a battery and including a test body 1 and a first door body 2. The test body 1 includes an accommodating cavity 11 for accommodating the battery, and an opening 12. The opening 12 communicates with the accommodating cavity 11, and the first door body 2 is connected to the opening 12 and capable of moving relative to the opening 12. The first door body 2 has a first state and a second state; in the first state, the first door body 2 blocks a part of the opening 12; and in the second state, the first door body 2 seals the opening 12.

The test body 1 is configured to test performance of the battery (performance under a condition such as high temperature, low temperature, or high pressure). For example, the test body 1 may be a temperature test chamber. For example, the test body 1 may further include a temperature generator for providing high temperature or low temperature for the accommodating cavity 11. For example, the test body 1 may further include a pressure generator for providing a high-pressure environment for the accommodating cavity 11.

The accommodating cavity 11 is a cavity disposed inside the test body 1 and communicates with outside through the opening 12.

The first door body 2 refers to a structure that can move relative to the opening 12 and can block the part of the opening 12. For example, a rotating shaft structure such as a hinge is disposed on an edge of the first door body 2, to connect the first door body 2 to the opening 12, so that the first door body 2 can rotate relative to the opening 12.

The first state refers to a state of closing the opening 12 by the first door body 2. In the first state, the first door body fits the opening 12. The second state refers to a state of opening the opening 12 by the first door body 2. In the second state, at least part of the first door body is farther away from the opening 12. Taking a rotary connection between the first door body 2 and the opening 12 as an example, an end, farther away from the rotating shaft structure, of the first door body 2 is farther away from the opening 12.

The first door body 2 is disposed, so that a partial region of the opening 12 can be blocked, thereby effectively improving structural strength of the testing apparatus and further improving safety of the testing apparatus during use.

Figure 4:
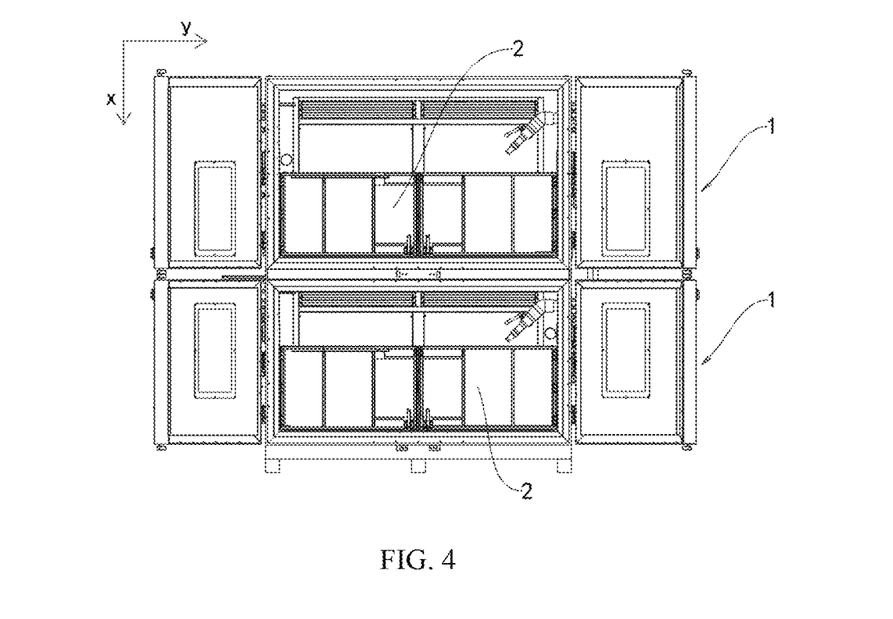
FIG. 4 is a schematic structural diagram of a testing apparatus according to some other embodiments of this application.

FIG. 4 is a schematic structural diagram of a testing apparatus according to some other embodiments of this application. Referring to FIG. 4, optionally, a plurality of accommodating cavities 11 and openings 12 may be disposed on the test body 1, and the plurality of accommodating cavities 11 are corresponding to the plurality of openings 12.

As shown in FIG. 1 to FIG. 3, in some optional embodiments of this application, the opening 12 includes a bottom edge 121 located at a bottom end of the opening 12 along a vertical direction (an X-axis direction in the figure), the first door body 2 abuts against the bottom edge 121, and in the first state, the first door body 2 seals a bottom of the opening 12.

The vertical direction refers to a direction of gravity.

The first door body 2 is disposed at the bottom edge 121 of the opening 12, so that the first door body 2 can seal a bottom of the opening 12 in the first state to make a bottom of the accommodating cavity 11 form a pool-shaped structure, where the pool-shaped structure has a function of storing a liquid. Generally, a battery cell may ignite during a safety accident; in this case, the foregoing pool-shaped structure is able to effectively store a fire extinguishing liquid during a fire extinguishing operation. Finally, the battery in the accommodating cavity 11 is fully submerged in the fire extinguishing liquid, resulting in a substantial fire suppression effect and further enhancing the safety of the testing apparatus during use.

Optionally, a rubber member may also be disposed on the bottom edge 121 and is configured to enhance airtightness after the first door body 2 abuts against the bottom edge 121.

As shown in FIG. 1 to FIG. 3, in some optional embodiments of this application, the testing apparatus further includes a second door body 3, the second door body 3 is disposed on a side of the first door body 2 farther away from the accommodating cavity 11, and the second door body 3 is configured to seal the opening 12.

The second door body 3 is disposed, so that the accommodating cavity 11 is completely sealed, thereby facilitating testing of the battery in the accommodating cavity 11.

Optionally, the first door body 2 and the second door body 3 are stacked along a direction leaving the opening 12.

Optionally, an observation window 31 is further disposed on the second door body 3, and the accommodating cavity 11 can be observed through the observation window 31 when the second door body 3 is closed.

As shown in FIG. 1 to FIG. 3, in some optional embodiments of this application, the opening 12 further includes a side edge connected to the bottom edge 121, and the first door body 2 is rotatably connected to the side edge.

The first door body 2 is rotatably connected to the side edge, to facilitate switching between the first state and the second state of the first door body 2.

Optionally, along the vertical direction, a plurality of rotating shaft structures may be disposed for connecting the side edge to the first door body 2.

Optionally, when the bottom edge 121 is connected to a plurality of side edges, the first door body 2 may be connected to any side edge.

As shown in FIG. 1 to FIG. 3, in some optional embodiments of this application, the side edge includes a first side edge 122 and a second side edge 123 correspondingly disposed on two sides of the bottom edge 121 along a first direction (a Y-axis direction in the figure), the first door body 2 includes a first portion 21 and a second portion 22, the first portion 21 is rotatably connected to the first side edge 122, the second portion 22 is rotatably connected to the second side edge 123, and the first direction is perpendicular to the vertical direction.

The first direction refers to a length direction of the bottom edge 121. Taking a square opening 12 as an example, the bottom edge 121 is a bottom edge of the square, and the first side edge 122 and the second side edge 123 are vertical sides.

The first portion 21 and the second portion 22 are any door panels of the first door body 2, and the door panel is rotatably connected to the first side edge 122 or the second side edge 123.

On the one hand, the first portion 21 and the second portion 22 are disposed, which can shorten a dimension of the first door body 2 in the first direction, shorten a distance from a rotating structure on the first door body 2 to the edge of the first door body 2, and further shorten a longest moment on the rotating shaft, so that the first door body 2 in the first state is not apt to be opened under external force. On the other hand, the first portion 21 is rotatably connected to the first side edge 122, and the second portion 22 is rotatably connected to the second side edge 123, so that the first door body 2 is a dual-door structure, which shortens an extension dimension of the first door body 2 towards the outside of the testing apparatus in the second state, and reduces interference of the testing apparatus to external space.

Optionally, a rotating direction of the first portion 21 is opposite to a rotating direction of the second portion 22, and in the first state, a side, farther away from the rotating structure, of the first portion 21 abuts against a side, farther away from the rotating structure, of the second portion 22.

Optionally, the first portion 21 and the second portion 22 can be arranged in the vertical direction and connected to a same side edge. That is, the first portion 21 and the second portion 22 are both connected to the first side edge 122, or the first portion 21 and the second portion 22 are both connected to the second side edge 123, which can control storage capacity of the formed pool-shaped structure by controlling the first portion 21 and the second portion 22 to enter the first state or the second state respectively.

As shown in FIG. 1 to FIG. 3, in some optional embodiments of this application, the first portion 21 and the second portion 22 in the second state are rotated to reach a side farther away from the accommodating cavity 11.

The first portion 21 and the second portion 22 in the second state are rotated to reach the side farther away from the accommodating cavity 11, which can reduce interference of switching between the first portion 21 and the second portion 22 on the accommodating cavity 11.

In some optional embodiments of this application, the first door body 2 further includes a fastening member 5, and the fastening member 5 is configured to fasten the first portion 21 to the second portion 22 in the first state.

The fastening member 5 refers to a latch-shaped structure for fastening the first portion 21 to the second portion 22.

The fastening member 5 is disposed, which can fix a positional relationship between the first portion 21 and the second portion 22 and improve mechanical strength of the first door body 2.

Figure 5:
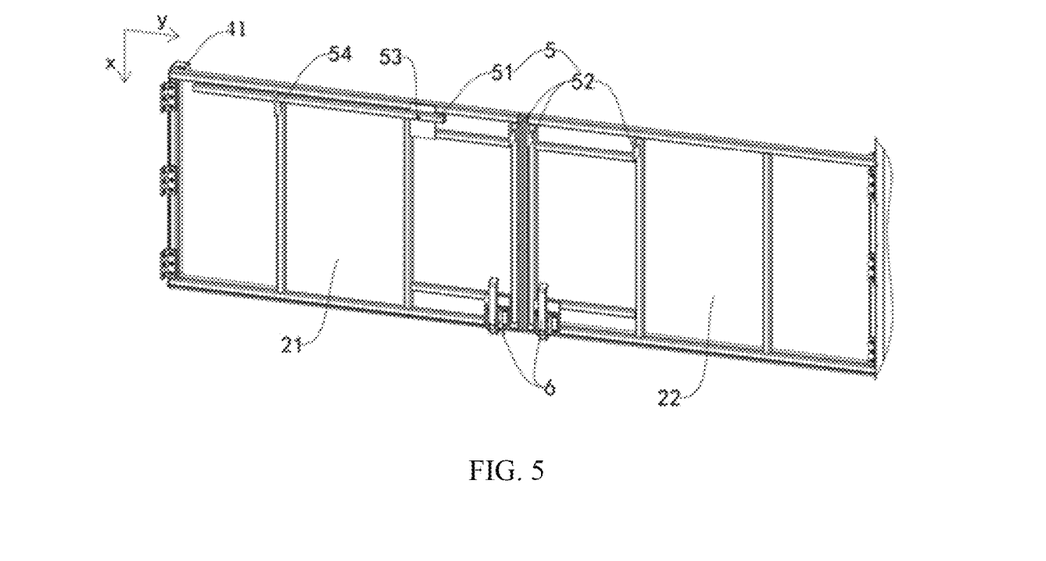
FIG. 5 is a schematic structural diagram of a first door body and a sealing assembly according to some embodiments of this application.

FIG. 5 is a schematic structural diagram of a first door body 2 and a sealing assembly 4 according to some embodiments of this application. As shown in FIG. 1, FIG. 2, FIG. 3, and FIG. 5, in some optional embodiments of this application, the fastening member 5 includes a fastening hook 52 and a fastening rod 51, a plurality of fastening hooks 52 are disposed, the plurality of fastening hooks 52 are respectively disposed on the first portion 21 and the second portion 22, and the fastening rod 51 fits the fastening hook 52 and is able to be accommodated in the plurality of fastening hooks 52.

The fastening hook 52 and the fastening rod 51 are disposed, which can facilitate fastening of the first portion 21 and the second portion 22.

Optionally, a fastening shaft 53 may be disposed at a long end of the fastening rod 51, so that the fastening rod 51 can be rotated with one end as a shaft; and the fastening rod 51 may be connected to a plurality of fastening hooks 52 when being rotated to enter a horizontal state, to fasten the first portion 21 to the second portion 22.

Optionally, a placement hook 54 is further disposed on the side, farther away from the fastening hook 52, of the fastening shaft 53 and configured to place the fastening rod 51 in the second state.

Optionally, two fastening hooks 52 may be disposed, and the two fastening hooks 52 have the same height in the vertical direction, and are respectively located on the first portion 21 and the second portion 22.

As shown in FIG. 1, FIG. 2, FIG. 3, and FIG. 5, in some optional embodiments of this application, the first door body 2 further includes a restraint member 6, and the restraint member 6 is configured to fasten the first door body 2 to the opening 12 in the first state.

The restraint member 6 refers to a pin-shaped structure for fastening the first door body 2 to the opening 12.

The restraint member 6 is disposed, which can fix a positional relationship between the first door body 2 and the opening 12 and improve mechanical strength of the first door body 2 in the first state.

In some optional embodiments of this application, the restraint member 6 includes a restraint pin and a restraint trough, the restraint pin is disposed on the first door body 2 and is movable relative to the first door body 2, the restraint pin fits the restraint trough and is able to move into the restraint trough, and the restraint trough is disposed on the bottom edge 121.

The restraint pin and the restraint trough are disposed, so that the structure of the restraint member 6 is simple, which facilitates disposition of the restraint member 6.

Optionally, an axial direction of the restraint pin may be parallel to the vertical direction, and the restraint pin can be controlled to enter or move out of the restraint trough by moving the restraint pin in the vertical direction.

As shown in FIG. 1 to FIG. 3, in some optional embodiments of this application, at least two restraint members 6 are disposed, and the two restraint members 6 are respectively disposed on the first portion 21 and the second portion 22.

At least two restraint members 6 are disposed, which can fix a positional relationship between the first door body 2 and the opening 12 and improve mechanical strength of the first door body 2 in the first state.

Optionally, the restraint member 6 may be disposed on a side, farther away from the rotating shaft structure, of the first portion 21 or the second portion 22.

Optionally, the first door body 2 further includes a fitting member for fastening the first door body 2 to the opening 12 in the second state, to prevent the first door body 2 from swinging in the second state and affecting access of the battery to the opening 12. If a magnetic structure or a hook structure is disposed on the first door body 2, the first door body 2 can be connected to the test body 1 in the second state.

As shown in FIG. 1 to FIG. 3, in some optional embodiments of this application, the restraint member 6 is disposed on a side, closer to the bottom edge 121, of the first door body 2, and the fastening member 5 is disposed on a side, farther away from the bottom edge 121, of the first door body 2.

The restraint member 6 is disposed on the side, closer to the bottom edge 121, of the first door body 2, and the fastening member 5 is disposed on the side, farther away from the bottom edge 121, of the first door body 2. On the one hand, it is convenient for the restraint member 6 to fasten the first door body 2 to the bottom edge 121. On the other hand, there are fastening structures on both sides of the first door body 2 in the vertical direction, which significantly improves the mechanical strength of the first door body 2.

As shown in FIG. 1 to FIG. 3, in some optional embodiments of this application, the testing apparatus further includes a bulge member 8 circumferentially disposed around the opening 12, so that the first door body 2 abuts against the bulge member 8 by reducing an area of the opening 12.

The bulge member 8 refers to a boss-shaped structure circumferentially disposed around the opening 12, and is configured to reduce flatness from the accommodating cavity 11 to the opening 12. For example, in the vertical direction, heights of the accommodating cavity 11 and the opening 12 are differentiated specifically at the bottom edge 121 of the opening 12. That is, a sill structure is formed at the bottom edge 121.

The bulge member 8 being disposed can form the sill structure at the opening 12, thereby improving airtightness after the opening 12 is connected to the second door body 3.

Optionally, the bulge member 8 and the test body 1 are integrally formed.

As shown in FIG. 1, FIG. 2, FIG. 3, and FIG. 5, in some optional embodiments of this application, the testing apparatus further includes a sealing assembly 4, where the sealing assembly 4 is disposed on a side, closer to the accommodating cavity 11, of the bulge member 8, fits the first door body 2, and is able to abut against an edge on a side, closer to the accommodating cavity 11, of the first door body 2 in the first state.

The sealing assembly 4 refers to a door frame-shaped structure that can fit the first door body 2 in the first state on the side, closer to the accommodating cavity 11, of the opening 12. A safety accident occurring in the accommodating cavity 11 is often accompanied by obvious inner pressure verge of the cavity, and the sealing assembly 4 disposed on the side, closer to the accommodating cavity 11, of the opening 12 can effectively withstand the pressure in the accommodating cavity 11, thereby improving the mechanical strength of the first door body 2.

The sealing assembly is disposed, which can seal a gap between the first door body 2 and the opening 12, thereby significantly improving a sealing effect of the first door body 2 on a part of the opening 12.

Optionally, the side, farther away from the bottom edge 121, of the sealing assembly 4 may not fit the first door body 2.

Optionally, silica gel resistant to high and low temperature may be further disposed at a joint of the sealing assembly 4 and the first door body 2 to implement sealing.

As shown in FIG. 1, FIG. 2, FIG. 3, and FIG. 5, in some optional embodiments of this application, the sealing assembly 4 includes a bottom rod 42 and upright rods 41 on two sides of the bottom rod 42 along the first direction, a bottom of the upright rod 41 is connected to a top of the bottom rod 42, and the bottom rod 42 is disposed on a side, closer to the bottom edge 121, of the accommodating cavity 11, and is connected to a side, closer to the accommodating cavity 11, of the bulge member 8; and in the first state, a side, farther away from the accommodating cavity 11, of the bottom rod 42 abuts against the bottom of the first door body 2, and sides, farther away from the accommodating cavity 11, of the two upright rods 41 abut against two sides of the first door body 2 respectively along the first direction.

The upright rod 41 and the bottom rod 42 are disposed, so that the sealing assembly 4 is U-shaped, which can simultaneously seal an upper bottom and both sides of the first door body 2, thereby improving the sealing effect on the first door body 2. In addition, the bottom rod 42 is connected to the bulge member 8, which also endows the sealing assembly 4 with excellent mechanical strength.

Optionally, the bottom rod 42 and the upright rod 41 may be integrally formed.

As shown in FIG. 1 to FIG. 3, in some optional embodiments of this application, the testing apparatus further includes a fire extinguishing member 7, and the fire extinguishing member 7 is configured to spray a fire extinguishing liquid into the accommodating cavity 11.

The fire extinguishing member 7 refers to a fire extinguishing system capable of spraying a fire extinguishing liquid into the accommodating cavity 11. For example, the fire extinguishing member 7 may include a fire extinguishing pipeline 71 and a sprinkler head 72, and the fire extinguishing pipeline 71 may extend from the outside of the test body 1 to inside of the accommodating cavity 11, and the sprinkler head 72 is connected to the fire extinguishing pipeline 71 and configured to spray the fire extinguishing liquid.

The fire extinguishing liquid refers to a liquid for extinguishing a fire, for example, water.

The fire extinguishing member 7 is disposed, to facilitate quick response when a fire occurs in the accommodating cavity 11.

In some optional embodiments of this application, a dimension of the first door body 2 is greater than a dimension of the battery along the vertical direction.

The dimension of the first door body 2 is greater than the dimension of the battery, so that the fire extinguishing liquid stored in the formed pool-shaped structure is high enough to submerge the battery, thereby improving the fire extinguishing effect on the battery.

Optionally, when the battery is placed in the accommodating cavity 11, an upper edge of the battery is lower than an upper edge of the first door body 2 along the vertical direction.

In some optional embodiments of this application, the testing apparatus further includes a sensor, and the sensor is disposed in the accommodating cavity 11 and configured to send an electrical signal when thermal runaway occurs in the battery.

A sensor refers to an apparatus that can sense thermal runaway of a battery, for example, a smoke sensor or a liquid leakage sensor.

The sensor is disposed, so that an alarm can be sent when thermal runaway occurs.

In some optional embodiments of this application, the testing apparatus further includes an exhaust member, and the exhaust member is disposed in the accommodating cavity 11 and configured to discharge gas from the accommodating cavity 11.

The exhaust member is disposed, which can promote rapid discharge of gas from the accommodating cavity 11.

Optionally, the exhaust member can be a fan or a negative pressure structure.

Optionally, the test body 1 is also provided with an exhaust channel communicating with the accommodating cavity 11, and an exhaust valve is disposed on the exhaust channel and configured to close or open the exhaust channel. The exhaust member ensures that negative pressure is formed in the exhaust channel, to promote discharge of gas from the accommodating cavity 11 and rapidly reduce pressure in the accommodating cavity 11.

In some optional embodiments of this application, the testing apparatus further includes a processor, and the processor is electrically connected to the sensor, the fire extinguishing member 7, and the exhaust member.

The processor refers to a unit capable of remotely controlling the processor, the sensor, the fire extinguishing member 7, and the exhaust member, for example, a CPU.

The processor is disposed, which can control the sensor, the fire extinguishing member 7, and the exhaust member, thereby improving automation of the testing apparatus.

Optionally, the testing apparatus further includes an alarm member, and the alarm member is electrically connected to the processor and can issue an alarm when thermal runaway occurs in the accommodating cavity 11, for example, a buzzer.

Optionally, the testing apparatus further includes a discharge member. The discharge member is disposed in the accommodating cavity 11 and can discharge the fire extinguishing liquid stored in the accommodating cavity 11. The discharge member can be integrated with the accommodating cavity 11 or may be disposed independently of the accommodating cavity 11. When the fire extinguishing liquid needs to be discharged from the accommodating cavity 11, the discharge member is transferred to the accommodating cavity 11 to work. For example, the discharge member refers to a pump body for promoting flowing of a liquid, for example, a drain pump.

An embodiment of this application provides a testing apparatus, configured to test a battery and including a test body 1 and a first door body 2. The test body 1 includes an accommodating cavity 11 for accommodating the battery, and an opening 12, and the opening 12 communicates with the accommodating cavity 11; and the first door body 2 is connected to the opening 12 and capable of moving relative to the opening 12. The first door body 2 has a first state and a second state; in the first state, the first door body 2 blocks a part of the opening 12; and in the second state, the first door body 2 seals the opening 12. The opening 12 includes a bottom edge 121 located at a bottom end of the opening 12 along a vertical direction, the first door body 2 abuts against the bottom edge 121, and in the first state, the first door body 2 seals a bottom of the opening 12. The testing apparatus further includes a second door body 3, the second door body 3 is disposed on a side of the first door body 2 farther away from the accommodating cavity 11, and the second door body 3 is configured to seal the opening 12. The opening 12 further includes a side edge connected to the bottom edge 121, and the first door body 2 is rotatably connected to the side edge. The side edge includes a first side edge 122 and a second side edge 123 correspondingly disposed on two sides of the bottom edge 121 along a first direction, the first door body 2 includes a first portion 21 and a second portion 22, the first portion 21 is rotatably connected to the first side edge 122, the second portion 22 is rotatably connected to the second side edge 123, and the first direction is perpendicular to the vertical direction. The testing apparatus further includes a bulge member 8 circumferentially disposed around the opening 12, so that the first door body 2 abuts against the bulge member 8 by reducing an area of the opening 12. The testing apparatus further includes a sealing assembly 4. The sealing assembly 4 is disposed on a side, closer to the accommodating cavity 11, of the bulge member 8, fits the first door body 2, and is able to abut against an edge on a side, closer to the accommodating cavity 11, of the first door body 2 in the first state. The testing apparatus further includes a fire extinguishing member 7, and the fire extinguishing member 7 is configured to spray a fire extinguishing liquid into accommodating cavity 11. A dimension of the first door body 2 is greater than a dimension of the battery along the vertical direction. The testing apparatus further includes a sensor, and the sensor is disposed in the accommodating cavity 11 and configured to send an electrical signal when thermal runaway occurs in the battery. The testing apparatus further includes an exhaust member, and the exhaust member is disposed in the accommodating cavity 11 and configured to discharge gas from the accommodating cavity 11. The testing apparatus further includes a processor, and the processor is electrically connected to the sensor, the fire extinguishing member 7, and the exhaust member.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A testing apparatus, configured to test a battery and characterized by comprising:
   a test body, comprising an accommodating cavity for accommodating the battery, and an opening, wherein the opening communicates with the accommodating cavity; and
   a first door body, connected to the opening and capable of moving relative to the opening, wherein the first door body has a first state and a second state, wherein
   in the first state, the first door body seals a part of the opening; and
   in the second state, the first door body avoids the opening, wherein the opening further comprises a side edge connected to a bottom edge, and the first door body is rotatably connected to the side edge, and
   the side edge comprises a first side edge and a second side edge correspondingly disposed on two sides of the bottom edge along a first direction, the first door body comprises a first portion and a second portion, the first portion is rotatably connected to the first side edge, the second portion is rotatably connected to the second side edge, and the first direction is perpendicular to the vertical direction.

2. The testing apparatus according to claim 1, wherein the opening comprises the bottom edge located at a bottom end of the opening along a vertical direction, the first door body abuts against the bottom edge, and in the first state, the first door body seals a bottom of the opening.

3. The testing apparatus according to claim 1, wherein the testing apparatus further comprises a second door body, the second door body is disposed on a side of the first door body farther away from the accommodating cavity, and the second door body is configured to seal the opening.

4. The testing apparatus according to claim 1, wherein the first portion and the second portion in the second state are rotated to reach a side farther away from the accommodating cavity.

5. The testing apparatus according to claim 1, wherein the first door body further comprises a fastener to fasten the first portion to the second portion in the first state.

6. The testing apparatus according to claim 5, wherein the fastener comprises a fastening hook and a fastening rod, a plurality of fastening hooks are disposed, the plurality of fastening hooks are respectively disposed on the first portion and the second portion, and the fastening rod fits the fastening hook and is able to be accommodated in the plurality of fastening hooks.

7. The testing apparatus according to claim 5, wherein the first door body further comprises a restraint structure to fasten the first door body to the opening in the first state.

8. The testing apparatus according to claim 7, characterized in that the restraint structure comprises a restraint pin and a restraint trough, the restraint pin is disposed on the first door body and is movable relative to the first door body, the restraint pin fits the restraint trough and is able to move into the restraint trough, and the restraint trough is disposed on the bottom edge.

9. The testing apparatus according to claim 7, wherein at least two restraint structures are disposed, and the two restraint structures are respectively disposed on the first portion and the second portion.

10. The testing apparatus according to claim 7, wherein the restraint structure is disposed on a side, closer to the bottom edge, of the first door body, and the fastener is disposed on a side, farther away from the bottom edge, of the first door body.

11. The testing apparatus according to claim 1, wherein the testing apparatus further comprises a bulge structure circumferentially disposed around the opening, so that the first door body abuts against the bulge structure by reducing an area of the opening.

12. The testing apparatus according to claim 11, wherein the testing apparatus further comprises a sealing assembly, wherein the sealing assembly is disposed on a side, closer to the accommodating cavity, of the bulge structure, fits the first door body, and is able to abut against an edge on a side, closer to the accommodating cavity, of the first door body in the first state.

13. The testing apparatus according to claim 12, wherein the sealing assembly comprises a bottom rod and upright rods on two sides of the bottom rod along the first direction, a bottom of the upright rod is connected to a top of the bottom rod, and the bottom rod is disposed on a side, closer to the bottom edge, of the accommodating cavity, and is connected to a side, closer to the accommodating cavity, of the bulge structure; and in the first state, a side, farther away from the accommodating cavity, of the bottom rod abuts against the bottom of the first door body, and sides, farther away from the accommodating cavity, of the two upright rods abut against two sides of the first door body respectively along the first direction.

14. The testing apparatus according to claim 1, wherein the testing apparatus further comprises a fire extinguisher to spray a fire extinguishing liquid into the accommodating cavity.

15. The testing apparatus according to claim 2, wherein a dimension of the first door body is greater than a dimension of the battery along the vertical direction.

16. The testing apparatus according to claim 14, wherein the testing apparatus further comprises a sensor, and the sensor is disposed in the accommodating cavity and configured to send an electrical signal when thermal runaway occurs in the battery.

17. The testing apparatus according to claim 16, wherein the testing apparatus further comprises an exhaust structure, and the exhaust structure is disposed in the accommodating cavity and configured to discharge gas from the accommodating cavity.

18. The testing apparatus according to claim 17, wherein the testing apparatus further comprises a processor, and the processor is electrically connected to the sensor, the fire extinguisher, and the exhaust structure.

* * * * *